June 17, 1969  T. H. NOLAN  3,450,379
VIBRATION ISOLATION DEVICE
Filed Sept. 15, 1967  Sheet 1 of 2
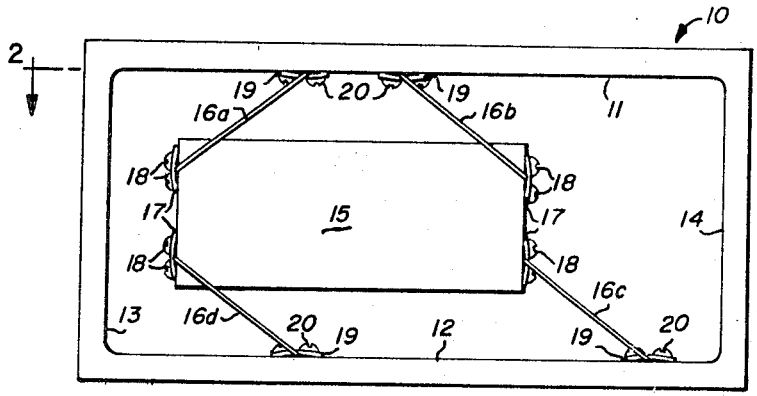
Fig_1
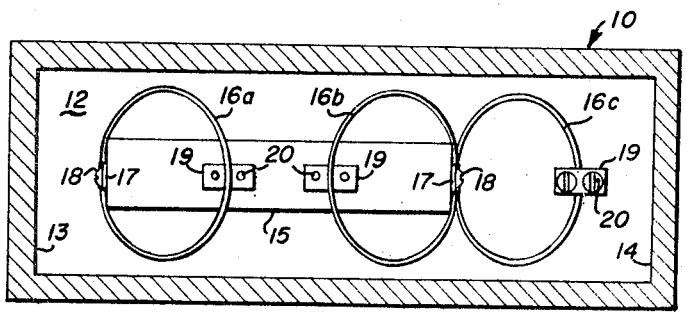
Fig_2
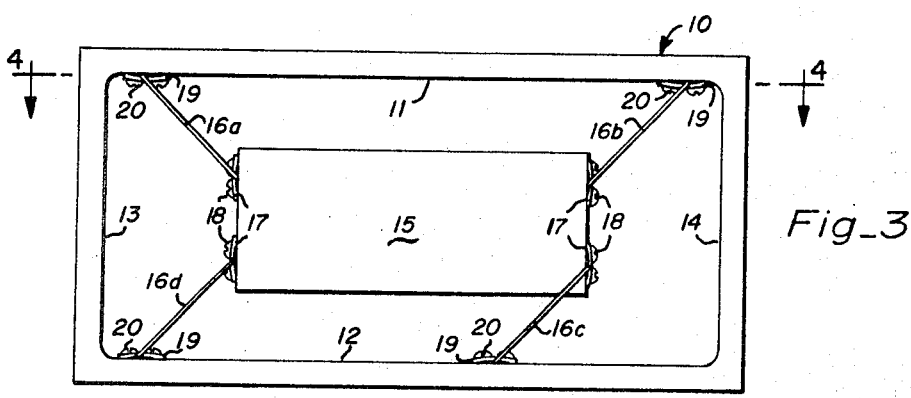
Fig_3
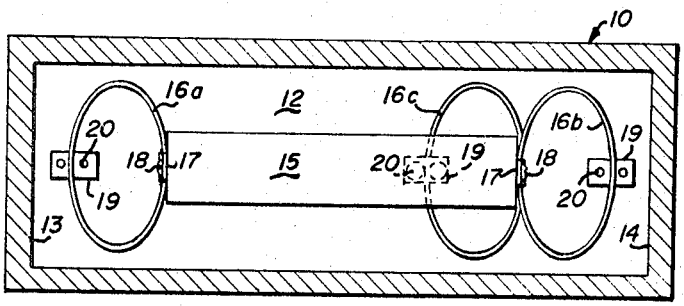
Fig_4
INVENTOR.
TERENCE H. NOLAN
BY
ATTORNEY

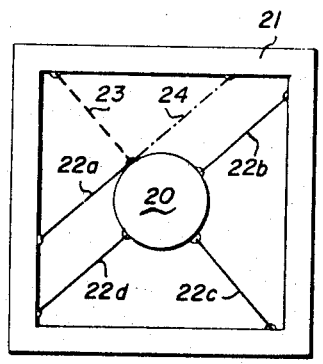
Fig_5A
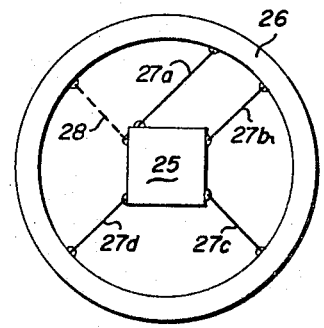
Fig_5B
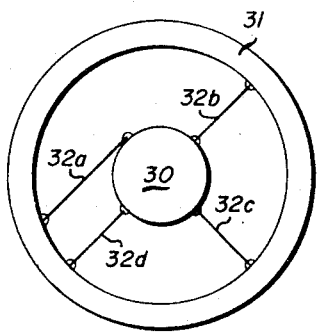
Fig_5C
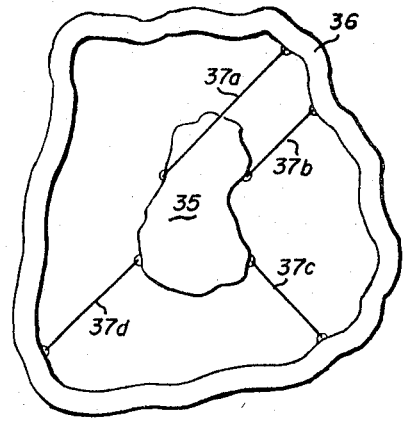
Fig_5D

United States Patent Office 3,450,379
Patented June 17, 1969

3,450,379
VIBRATION ISOLATION DEVICE
Terence H. Nolan, Palo Alto, Calif., assignor to Itek Corporation, Lexington, Mass., a corporation of Delaware
Filed Sept. 15, 1967, Ser. No. 667,996
Int. Cl. F16f 15/04
U.S. Cl. 248—358     10 Claims

ABSTRACT OF THE DISCLOSURE

Stranded cables forming circular loops and connecting, at diametrically opposed points, a supported member within a supporting member for isolation mounting of sensitive instruments or the like and for vibration damping. An asymmetrical positioning of the loop-type cables tends to break up system resonance thereby improving low frequency isolation.

BACKGROUND OF THE INVENTION

Field of the invention

The present invention relates generally to isolation mounting, and more particularly, to loop-type stranded cables connected in an asymmetrical manner to break up system resonance.

Description of the prior art

While a number of vibration damping and load-supporting devices have been devised as shown by at least U.S. Patents Nos. 3,204,911 and 3,204,913, there is still a need for improving isolation mountings for sensitive instruments to break up system resonance and to improve low frequency isolation. It has been noted that prior art devices provide insufficient isolation at frequencies below 100 cycles per second.

SUMMARY OF THE INVENTION

In general terms, it is an objective of the present invention to provide a new and improved vibration isolation mounting to isolate a load from the forces of shock and vibration. Specifically, by way of example, loop-type cables connect a supported member within a supporting member, and the planes of the cables are arranged in an asymmetrical manner to isolate a delicate instrument from shock and vibration, and to prevent excessive excursion of the instrument load at or near mechanical resonance. In this manner, low frequency isolation is improved, and the mechanical construction of the isolation device is simplified.

The term "stranded wire" cable is used herein and in the appended claims to refer to a cable made by twisting a number of smaller diameter cables which in turn may be made up of a number of twisted wires of still smaller diameter. A 7 x 7 stranded wire cable means that it is made of 7 smaller diameter cables each of which is made of 7 still smaller diameter strands. In other words, there are 49 strands arranged in 7 groups of 7 strands. These cables are essentially dead since the vibration and shock energy is absorbed by the interstrand friction. The term "loop" is used herein and in the appended claims to refer either to a continuous closed single loop or an open 360 degrees loop having ends anchored adjacent to one another or two 180 degree loops having ends on each side anchored adjacent to one another. In other words, the term only applies to the active length of cable between points of attachment. The term circular loop denotes two circular pieces of active length between points of attachment.

It will be appreciated that the preferred embodiments show only examples of isolation mountings for a load to achieve the improvements hereinabove mentioned.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawings in which:

BRIEF DESCRIPTION OF THE DRAWINGS

The principles of the invention will be more readily understood by reference to the following detailed description of the drawings, of which:

FIG. 1 is a plan view of the isolation mounting of the invention;

FIG. 2 is an elevation view of the mounting of FIG. 1;

FIG. 3 is a plan view of a modification of the mounting of FIG. 1;

FIG. 4 is an elevation view of the mounting of FIG. 3; and

FIGS. 5A, 5B, 5C and 5D are schematic plan views of the isolation mounting of a number of differently shaped supporting and supported members.

DESCRIPTION OF THE PREFERRED EMBODIMENT

Referring now to FIGS. 1 and 2, a load supporting member 10 is shown having top and bottom walls 11 and 12 in a substantially parallel relation, and substantially perpendicular thereto are side walls 13 and 14. Member 10 may be supported on the main frame of an aircraft or other vehicle (not shown). Mounted for vibration isolation within supporting member 10 is supported member 15. Shocks and vibrations acting on supporting member 10 are not imparted to the support member 15 which may therefore be any delicate instrumentation or device to be protected from shock or vibration.

Adjacent each corner of supported member 15 are stranded cable loops 16a, 16b, 16c and 16d. Loops 16 are secured to member 15 by clamp blocks 17 and bolts 18. Cable loops 16 are placed between member 15 and clamp blocks 17, and the bolts 18 are tightened to secure the cable loops to the supported member.

Stranded cable loops 16a, 16b, 16c and 16d extend outwardly from supported member 15 and are secured, at diagonally opposed points, to supporting member 10 of the top and bottom walls 11 and 12 as by mounting clamps 19 and bolts 20.

The diameter of loops 16 and the mass of supported member 15 (including clamp blocks 17) are selected to obtain the desired high suspension resonance frequency. In the preferred embodiment, loop 16 have a diameter of 1.2 inches, and oscillator assembly 15 has approximately a mass of 5 ounces. Also, in the preferred embodiment, loops 16 are constructed of 49-strand ³⁄₆₄" diameter wire rope, commonly know as 7 x 7 cable, and is so selected that the cable is substantially "dead" insofar as vibration and resonance are concerned.

It should be noted in FIG. 1 that the cable loops are asymmetrically located in that cable loops 16a, 16b and 16c are substantially parallel to one another and perpendicular to cable loop 16a. If loop 16c were turned through an angle of 90 degrees about its point of attachment with supported member 15, the suspension would be one which is normal. Such a normal suspension would, for greatest stability, have the loops oriented about 90 degrees with respect to one another and 45 degrees with respect to the horizontal direction. Also, there would be mirror symmetry with respect to a horizontal axis and a vertical axis. Applicant's invention, reduced to simplest terms, comprises a normal suspension with one loop rotated through 90 degrees about its point of attachment to the supported member.

Reference is now made to FIGS. 3 and 4 in which the same reference characters as in FIG. 1 are used to designate like parts. As there seen, supported member 15 is again supported by loops 16a, 16b, 16c and 16d within a supporting member 10 to isolate the supported member from vibration of the supporting member. It should be noted that three of the loops, namely, loops 16b, 16c and 16d are substantially parallel to each other, whereas the fourth loop 16a lies in a plane that is substantially perpendicular to the planes of the other loops. Again, the loops are asymmetrically located as in FIG. 1, but in FIG. 3 embodiment the asymmetrically disposed loop is directed inwardly from supported member 15, whereas all the other loops are directed outwardly. If all four loops were directed outwardly, a suspension pattern which is "normal" or symmetrical would be obtained.

The term normal suspension pattern, as used in the specification and claims, has reference to arranging the loops so that each loop has a plane which is substantially radial with respect to a point in the supported member or which is oriented at 90 degrees with respect to a radial position. For example, if loop 16c in FIG. 1 were rotated through 90 degrees about its point of attachment to member 15, a "normal" suspension of the radial type results. Doing the same to loop 16c of FIG. 1 provides the other type of "normal" suspension. The particular type of suspension utilized depends on the space within the supporting member relative to the volume of the supported member. Obviously, a larger space is required for the FIG. 3 suspension than for the FIG. 1 suspension.

For a weight of supported member 15 of about 5 ounces and for 49 strands of $3/64''$ diameter wire rope having a loop diameter of 1.2 inches, the resonance frequency of a "normal" suspension would be about 9 Hz. By flipping one of the loops through 90 degrees, the resonance frequency at one corner is changed to, say, 7½ Hz., and the direction of displacement due to shocks and vibrations is changed from that of the other corners. The effect on the whole structure is to make the resonance frequency very undistinct and uncertain, there being a number of frequencies at which some resonance effects are noted. Further, the displacement of the supported member when subjected to shocks and vibrations becomes very complex and much less violent or distinct as experienced with "normal" suspensions. It is therefore believed that the asymmetric positioning of one of the loops by flipping the same through an angle 90 degrees breaks up the resonance and thereby more effectively isolates the supported member from the supporting member.

Referring now to FIGS. 5A, 5B, 5C and 5D, there are shown supporting apparatus, constructed in accordance with this invention, for a number of differently configured supporting members and supported members.

FIG. 5A shows a supported member 20 of cylindrical or spherical configuration supported within a supporting member 21 having a parallepipedonal inner space. Four stranded wire loope 22a, 22b, 22c and 22d provide the suspension and loop 22a is the asymmetrically disposed loop. Dashed line 23 indicates the position of loop 22a for a "normal" suspension. Dash-dotted line 24 indicates an alternate position for loop 22a which is asymmetric and disposed at an angle of 90 degrees from a "normal" position.

FIG. 5B shows a supported member 25 of parallepipedonal configuration supported within a cylindrical or spherical cavity in supporting member 26. Stranded wired loops 27a, 27b, 27c and 27d form the supporting means. As is readily seen, loop 27a is asymmetrically disposed in accordance with this invention. All points of support, except for the connection of loop 27a and supporting member 26 are selected in accordance with criteria for a "normal" suspension arrangement, i.e., in which loop 27a would be as indicated by dotted line 28.

FIG. 5C shows a cylindrical or spherical member 30 supported within a cylindrical or spherical cavity 31. Standard wire loops 32a, 32b, 32c and 32d from the supporting means with loop 32a being asymmetrically arranged. FIG. 5D shows an irregularly shaped member 35 supported with an irregularly shaped cavity 36. Stranded wire loops 37a, 37b, 37c and 37d form the supporting structure with loop 37a being asymmetrically disposed.

Thus, a number of modifications of vibration isolation support of a supported member have been described wherein three of the cable loops are in substantially parallel planes and the fourth loop lies in a plane that intersects the parallel planes at approximately a right angle. The asymmetrical positioning of the loops tends to break up system resonance and improves low frequency isolation.

It should be additionally noted that while a number of embodiments have been described, details can be modified from that specifically shown and described hereinabove and, accordingly, the foregoing description is not to be construed in a limiting sense and the scope of the invention is to be indicated by reference to the appended claims.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. It is the intention, therefore, to be limited only as indicated by the scope of the following claims.

What is claimed is:

1. A vibration damping and load supporting apparatus for interconnecting a supporting member and a supported member, comprising:
   a plurality of substantially circular loops of stranded wire cables;
   means for securing diametrically opposite points of said loops, respectively, to the supported member and the supporting member; and
   said means for securing being arranged such that the planes defined by said circular loops are perpendicular to a common plane and asymmetric with respect to any line lying in said common plane.

2. A vibration damping and load supporting apparatus in accordance with claim 1 in which said plurality of circular loops comprises four in number.

3. A vibration damping and load supporting apparatus in accordance with claim 2 in which the four points of attachment of said loops to the supported member are distributed around the periphery of the supported member and lie in said common plane.

4. A vibration damping and load supporting apparatus in accordance with claim 3 in which said common plane passes through the center of gravity of the supported member.

5. A vibration damping and load supporting apparatus in accordance with claim 2 in which the plane defined by one of said loops is substantially parallel to the planes defined by the immediate adjacent loops and substantially perpendicular to the plane defined by the opposite loop.

6. A vibration damping and load supporting apparatus in accordance with claim 2 in which the angular position of the planes defined by said loops differs by approximately 90 degrees between adjacent loops except for one loop which is substantially parallel to both its adjacent loops.

7. A vibration damping and load supporting apparatus in accordance with claim 2 in which the plane defined by three of the loops are substantially parallel to one another and perpendicular to the plane defined by the remaining loop.

8. A vibration damping and load supporting apparatus in accordance with claim 2 in which said loops are positioned so that the supported member remains in substantially the same position with respect to the supporting member as the supporting member is rotated about an axis perpendicular to said common plane and in which the plane of one loop is rotated through about 90 degrees from a position in which it has been symmetric with respect to the planes of the other loops.

9. A vibration damping and load supporting apparatus comprising:
 a supporting member;
 a supported member;
 four substantially circular loops of stranded wire cables; and
 means for securing diametrically opposite points of said loops, respectively, to said supported member and said supporting member, the four points of attachment of said loops to said supported member being distributed about the periphery of said supported member and lying in a common plane passing through the center of gravity of said supported member, the plane[s] defined by one of said loops being substantially parallel to the planes defined by the loops on either side thereof and substantially perpendicular to the plane of the remaining loop.

10. A vibration clamping and load supporting apparatus for interconnecting a supporting member and a supported member, comprising:
 four substantially circular loops of stranded wire cables;
 means securing diametrically opposite points of said loops, respectively, to the supported member and the supporting member; and
 said means for securing being arranged such that three of said loops are disposed in a normal suspension pattern and the remaining one of said loops is secured to the supported member as in a normal suspension pattern but extends towards the supporting member at an angle of about 90 degrees from that of a normal suspension pattern.

References Cited

UNITED STATES PATENTS

| | | | |
|---|---|---|---|
| 1,795,313 | 3/1931 | Nies | 248—18 |
| 2,415,983 | 2/1947 | Yerzley | 248—358 |
| 3,204,913 | 9/1965 | Lawrence et al. | 248—358 |

CHANCELLOR E. HARRIS, *Primary Examiner.*

JOHN PETO, *Assistant Examiner.*